United States Patent
Lindoff et al.

(10) Patent No.: US 10,306,488 B2
(45) Date of Patent: May 28, 2019

(54) CONTROLLER NODE, METHOD AND COMPUTER PROGRAMRAT

(71) Applicant: Telefonaktiebolaget LM Ericsson (publ), Stockholm (SE)

(72) Inventors: Bengt Lindoff, Bjarred (SE); Magnus Astrom, Lund (SE); Per Persson, Sodra Sandby (SE)

(73) Assignee: TELEFONAKTIEBOLAGET LM ERICSSON (publ), Stockholm (SE)

(*) Notice: Subject to any disclaimer, the term of this patent is extended or adjusted under 35 U.S.C. 154(b) by 10 days.

(21) Appl. No.: 15/571,110

(22) PCT Filed: May 20, 2016

(86) PCT No.: PCT/EP2016/061446
§ 371 (c)(1),
(2) Date: Nov. 1, 2017

(87) PCT Pub. No.: WO2017/198312
PCT Pub. Date: Nov. 23, 2017

(65) Prior Publication Data
US 2018/0234861 A1    Aug. 16, 2018

(51) Int. Cl.
*H04W 8/02* (2009.01)
*H04W 24/02* (2009.01)
(Continued)

(52) U.S. Cl.
CPC ........... *H04W 24/02* (2013.01); *H04W 8/02* (2013.01); *H04W 68/02* (2013.01); *H04W 52/0274* (2013.01); *H04W 84/042* (2013.01)

(58) Field of Classification Search
CPC ....... H04W 24/02; H04W 8/02; H04W 68/02; H04W 84/042; H04W 52/0274
See application file for complete search history.

(56) References Cited

U.S. PATENT DOCUMENTS

| 6,188,905 B1 | 2/2001 | Rudrapatna et al. |
| 2007/0149192 A1* | 6/2007 | Kim ............... H04W 60/04 455/435.1 |

(Continued)

FOREIGN PATENT DOCUMENTS

| EP | 2416609 A1 | 2/2012 |
| EP | 2731383 A1 | 5/2014 |

(Continued)

OTHER PUBLICATIONS

PCT International Search Report, dated Oct. 24, 2016, in connection with International Application No. PCT/EP2016/061446, all pages.

(Continued)

*Primary Examiner* — Hashim S Bhatti
(74) *Attorney, Agent, or Firm* — Leffler Intellectual Property Law, PLLC

(57) ABSTRACT

A method of a controller node arranged to act with or within a cellular radio access network, RAN, is disclosed. The method comprises determining mobility data for UEs in active mode in at least a part of the RAN, estimating mobility data for UEs in idle mode in the at least the part of the RAN and determining reliability of the mobility data estimates, causing the RAN to page, when reliability of mobility data estimates of a set of the idle UEs is below a threshold, the set of the idle UEs and receive updated position information for the mobility data estimates, and determining a mobility situation within the at least the part of the RAN from the determined mobility data for the active UEs and the estimated mobility data for the idle UEs. The method further comprises comparing the determined mobility situation with one or more stored mobility situation data, and taking one or more control actions for the RAN when a change or anomaly is discovered in the determined mobility (Continued)

situation and based on the comparison. Such a controller node and a computer program therefor are also disclosed.

21 Claims, 5 Drawing Sheets

(51) Int. Cl.
*H04W 68/02* (2009.01)
*H04W 52/02* (2009.01)
*H04W 84/04* (2009.01)

(56) References Cited

U.S. PATENT DOCUMENTS

| | | | |
|---|---|---|---|
| 2010/0035633 A1* | 2/2010 | Park | H04W 60/04 |
| | | | 455/456.1 |
| 2012/0142371 A1* | 6/2012 | Park | H04W 60/02 |
| | | | 455/456.1 |
| 2015/0201348 A1 | 7/2015 | Gupta et al. | |
| 2016/0007316 A1* | 1/2016 | Vaidya | H04W 68/02 |
| | | | 370/312 |

FOREIGN PATENT DOCUMENTS

| | | |
|---|---|---|
| EP | 2963984 A1 | 1/2016 |
| WO | 2011138351 A1 | 11/2011 |
| WO | 2012042375 A2 | 4/2012 |
| WO | 2011/138351 * 12/2015 | ............ H04W 24/02 |

OTHER PUBLICATIONS

PCT Written Opinion, dated Oct. 24, 2016, in connection with International Application No. PCT/EP2016/061446, all pages.

\* cited by examiner

CONTROLLER NODE, METHOD AND COMPUTER PROGRAMRAT

TECHNICAL FIELD

The present invention generally relates to a controller node arranged to act with or within a cellular radio access network, a method for the controller node, and a computer program for implementing the method in a controller node.

ABBREVIATIONS

Abbreviation Explanation
BDA Big Data Analytics
NW Network
IoT Internet of Things
MME Mobility Management Entity
TA Tracking Area
GPS Global Positioning System
RAN Radio Access Network
UE User Equipment

BACKGROUND

In current cellular systems the NW deployment done is static in the sense that deployed NW nodes typically operate the same way all the time. However, in many scenarios, the capacity needed in certain places may vary depending on say time of the day, or also in between days depending on say "rush hours". The operation of NW nodes may be adapted based on statistics on such time-dependent capacity needs, but still according to a predetermined scheme.

Whenever the demanded traffic deviates from this predetermined scheme, the NW deployment either provides too much capacity, and thus likely consumes too much energy, or provides too little capacity, which is likely to cause the users of the NW to experience bad service. It is therefore a desire to provide a dynamic NW deployment.

EP 2731383 discloses a micro base station controller which receives a geographical position of a mobile station and when the mobile station position matches the position of a micro base station the controller instructs the micro base station to serve the mobile station, e.g. by instructing the micro base station to change from sleep state into wake-up state. The controller further instructs a micro base station to go into sleep mode when there does not exist any mobile station in a macro base station coverage area.

EP2416609 discloses a system where small cell base stations are switched on and off, i.e. between an active state and a dormant state. A controller receives, via a macro base station, a report on a location of a terminal, wherein the controller determines whether the small cell base station is within a threshold distance from the terminal and sends a control command to the small cell base station whether to change state.

WO 2012/042375 discloses that a serving base station may wake up a neighbouring sleep mode base station when link quality to a UE is lower than a threshold.

SUMMARY

The invention is based on the understanding that dynamic NW deployment requires proper information about necessary adaptations. The inventors have realized that analysis of mobility situation may provide proper information.

According to a first aspect, there is provided a controller node arranged to act with or within a cellular radio access network, RAN. The controller node is arranged to determine mobility data for User Equipment, UEs, in active mode in at least a part of the RAN, estimate mobility data for UEs in idle mode in the at least the part of the RAN and determine reliability of the mobility data estimates, cause the RAN to page, when reliability of mobility data estimates of a set of the idle UEs is below a threshold, the set of the idle UEs and receive updated position information for the mobility data estimates, determine a mobility situation within the at least the part of the RAN from the determined mobility data for the active UEs and the estimated mobility data for the idle UEs, compare the determined mobility situation with one or more stored mobility situation data, and take one or more control actions for the RAN upon a change in the determined mobility situation and based on the comparison.

The comparison may include identifying an anomaly or change in trend of mobility situation, wherein the one or more action may include causing one or more network nodes of the RAN to change operation. The change of operation may include switching on or off operation.

The one or more stored mobility situation data sets may comprise a representation of a previous or historical mobility situation, or statistics on mobility situations.

The set of idle UEs may be defined by an area being paged, or alternatively by a certain selection of UEs.

The received updated position information may comprise one or more of a cell identification, a satellite position system provided position, and a position determined based on transmission properties between the UE and network nodes of the RAN, e.g. signal time-of-arrival determination of signals and/or channel attenuation between respective UE and network nodes of the RAN, beamforming data, etc.

The mobility situation may be determined at regular occasions.

The one or more actions may include exchanging information with one or more external entities, wherein the exchange of information may include providing data on the mobility situation. The exchange of information may include providing control information for performing one or more of reserving storage or computing resources, migrating databases or applications from a first server to a second server, adapting operation of a charging mechanism associated with the cellular RAN, and reserving or allocating backhaul communication capacity.

According to a second aspect, there is provided a method of a controller node arranged to act with or within a cellular radio access network, RAN. The method comprises determining mobility data for UEs in active mode in at least a part of the RAN, estimating mobility data for UEs in idle mode in the at least the part of the RAN and determining reliability of the mobility data estimates, causing the RAN to page, when reliability of mobility data estimates of a set of the idle UEs is below a threshold, the set of the idle UEs and receive updated position information for the mobility data estimates, determining a mobility situation within the at least the part of the RAN from the determined mobility data for the active UEs and the estimated mobility data for the idle UEs, comparing the determined mobility situation with one or more stored mobility situation data, and taking one or more control actions for the RAN when a change or anomaly is discovered in the determined mobility situation and based on the comparison.

The comparing may include identifying the anomaly or change in a trend of the mobility situation, wherein the one or more control actions may include causing one or more network nodes of the RAN to change operation. The change of operation may include switching on or off operation.

The one or more stored mobility situation data sets may comprise a representation of a previous or historical mobility situation, or statistics on mobility situations.

The set of idle UEs may be defined by a certain selection of UEs, or alternatively by an area being paged.

The received updated position information may comprise one or more of a cell identification, a satellite position system provided position, and a position determined based on transmission properties between the UE and network nodes of the RAN, e.g. signal time-of-arrival determination of signals and/or channel attenuation between respective UE and network nodes of the RAN, beamforming data, etc.

The mobility situation may be determined at regular occasions.

The one or more actions may include exchanging information with one or more external entities, wherein the exchange of information may include providing data on the mobility situation. The exchange of information may include providing control information for performing one or more of reserving storage or computing resources, migrating databases or applications from a first server to a second server, adapting operation of a charging mechanism associated with the cellular RAN, and reserving or allocating backhaul communication capacity.

According to a third aspect, there is provided a computer program comprising instructions which, when executed on a processor of a controller node, causes the controller node to perform the method according to the second aspect.

BRIEF DESCRIPTION OF THE DRAWINGS

The above, as well as additional objects, features and advantages of the present invention, will be better understood through the following illustrative and non-limiting detailed description of preferred embodiments of the present invention, with reference to the appended drawings.

DETAILED DESCRIPTION

In the following, the terms "mobile communication device" and "UE" (User Equipment) are used interchangeably, and may consider any element that is capable of communicatively operating in a cellular communication network, such as a mobile phone, communication card, modem, etc. That is, the feature "mobile" reflects the ability to operate in a cellular communication system, with cell reselection etc., and not its ability to move. A UE in this context may for example be a modem, a smartphone, a cellphone, a computer, or any electric or electronic device capable of wireless communication with a NW node. More and more items we previously knew as rather simple objects are now capable of this, which has, and will, provide for some of the great improvements in many fields, even outside the conventional telecommunication industry. Examples are sensors, actuators, machines, medical equipment, monitoring devices, etc. that has been enhanced by being able to wirelessly communicate with wireless nodes of different wireless communication systems.

In current cellular systems the NW deployment done is static in the sense that deployed NW nodes typically is on all the time. However, in many scenarios, the capacity needed in certain places may vary depending on say time of the day, or also in between days depending on say "rush hours" or some certain sports event etc. since power consumption is important also for an operator it is likely that in future NW deployment having several small cells, enabling and disabling of cells depending on capacity demands will be a likely deployment, i.e. cells which have been identified as possible to shut-down temporarily. Hence, some of the cells, by their NW nodes, may be in dormant state and hence only be turned on when necessary for saving power consumption and thereby cost for the operator.

The adaptation, e.g. turning on or off NW nodes which are operating the identified cells, is preferably made based on the potential demands of mobile devices, i.e. UEs, being in operation area of those cells. To be able to estimate the potential demand, it is desirable to have information about the mobility situation for the mobile devices The mobile device position may for example only be known by NW node granularity when connected, i.e. in active mode. In case the UE is inactive, i.e. in idle mode, the RAN, by a mobility management entity, MME, only knows that the device is within a certain tracking area, TA, i.e. an area where paging messages are transmitted once the device needs to be reached, or set of TAs. A TA may be several tenths or hundreds of NW nodes, and hence knowledge of a single device position and device movement in idle mode is much less accurate compared to active mode where the device may be known within 20-100 m, depending on inter-NW node distance, topology and population density.

Figure 1:
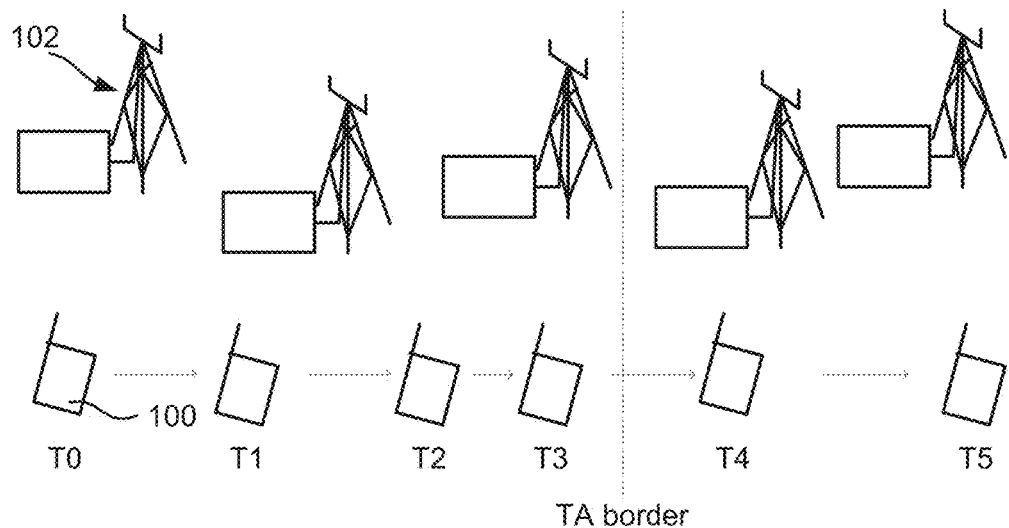
FIG. 1 schematically illustrates a mobile communication device over time passing a plurality of network nodes of a RAN.
Figure 2:
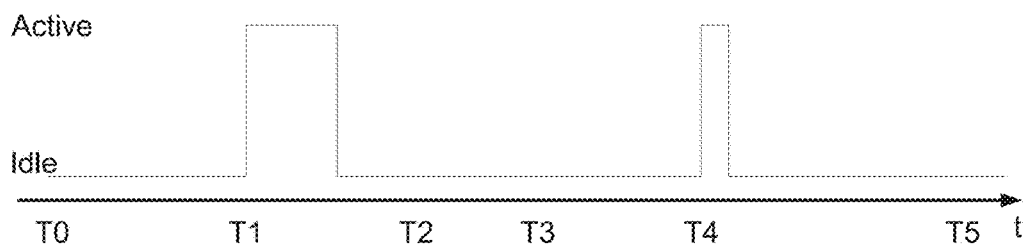
FIG. 2 is a state diagram for the mobile communication device of FIG. 1 when employing conventional mobility monitoring.
Figure 3:
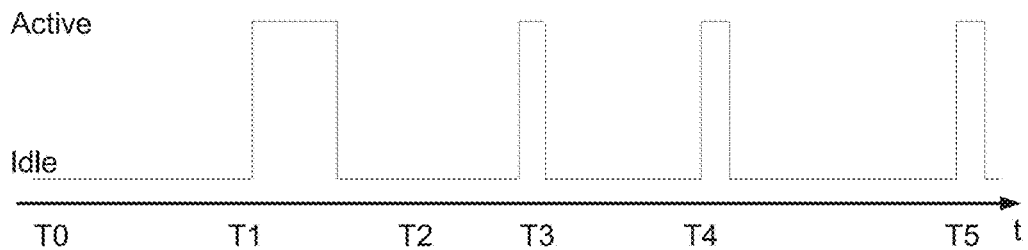
FIG. 3 is a state diagram for the mobile communication device of FIG. 1 when employing the suggested approach according to an embodiment.

FIG. 1 schematically illustrates a mobile communication device 100 over time (T0-T5) passing a plurality of network nodes 102 of a RAN, and FIG. 2 is a state diagram for the mobile communication 100 device of FIG. 1 when employing conventional mobility monitoring. Here, a reliable indication on position is only present when the mobile communication device 100 has been in active state due to some communication activities, i.e. from T1 and a short period after that, e.g. until T2, or when a tracking area update has recently been performed, i.e. at T4 and a short period after that. FIG. 3 is a state diagram for the mobile communication device 100 of FIG. 1 when employing the suggested approach according to an embodiment, where the mobile communication device 100 is paged at some occasions, i.e. at T3 and T5, wherein reliable indication on positions are acquired for the mobile communication device at those times and short periods after those, respectively. This approach will be further demonstrated with reference to the method illustrated by the flow chart of FIG. 4.

Big data analytics, BDA, is the process of examining large data sets containing a variety of data types-- i.e., big data-- to detect hidden patterns, unknown correlations, market trends, customer preferences and other useful information. The analytical findings can lead to improved operational efficiency, better user satisfaction, improved utilization of resources, competitive advantages over rival organizations and other business or societal benefits. The primary goal of big data analytics is to help companies make more informed business decisions by enabling data scientists, predictive modellers and other analytics professionals to analyze large volumes of transaction data, as well as other forms of data that could include Web server logs and Internet clickstream data, social media content and social network activity reports, text from customer emails and survey responses, mobile-phone call detail records and machine data captured by sensors connected to the Internet of Things etc.

BDA may be very important to mobile operators. Examples of use case for BDA may be Optimization, e.g in view of quality of service, through better network traffic analysis, for instance enabling and disabling of small cells depending on current or future predicted capacity, as mentioned above.

Prevention of fraudulent behaviour, e.g. by analysis of call data records.

Tailored marketing campaigns to individual customers— by location and social networks.

Development of new products and services based on customer behaviour analysis.

Resale of BDA information to specialized BDA organizations.

BDA may be used by the mobile operator using special probes in its network that capture billions of daily records, which are then processed to extract useful metrics and (supposedly) anonymized where necessary to remove personal subscriber details. A network with millions of subscribers might generate 10s of billions of data records each day—these all need to be stored, processed, analyzed and finally interpreted.

By using the knowledge of flows of the UEs, e.g. mobile phones/devices/sensors, IoT devices, etc., hereinafter called device flows, and hence the corresponding flow/movement of humans, vehicles etc. might be of major importance for many different use cases. For example, it might be incredibly useful to know when the device flow suddenly has changed for fast enablement of dormant NW nodes and disabling of excessive NW nodes, for instance due to specific events e.g., by adding capacity before and after a football match, saving power when the crowd has left, etc.

Hence, as long as devices are not actively connected to a NW node, information about device flows to be used for BDA could not be very accurate, and hence the BDA could not indicate to the cellular NW the need for enabling and/or disabling (small) cells in order to enhance the capacity, before the actual need for increased capacity is needed. Therefore, there is suggested a method and an apparatus for a controller node capable of BDA to be able to get information about device positions and device flows also in case they have not been active for a long time for—in the end—improved cellular network performance. The controller node may be arranged to act within a Radio Access Network, RAN, or to act with the RAN.

It is suggested a controller node that actively monitors the device flows at certain geographical areas, where the device flow is monitored by NW nodes, e.g. eNode B or position node, which report positions, e.g. on NW granularity or GPS granularity, for actively connected devices. The device flows are monitored for detecting anomalies, or events with regard to historical device flow data. Once the controller node detects it, there may not be sufficient data for accurate device flow estimates—for instance due to that a majority of the devices are inactive, wherein the controller node orders a set of NW nodes belonging to at least one operator to page the devices in order to excite the system, i.e. get more information about positions of the devices. The paging can be made within a certain geographical area, or distributed in order to detect where a certain set of devices currently are. Once significant device flow change compared to historical data have been detected, the controller node may in some embodiments inform the cellular RAN to enable dormant base stations/cells in the affected areas, and/or enable switching-off some base stations/cells.

With the proposed approach, the controller node has the possibility to be pro-active and excite at least parts of the cellular system and hence get up-to-date information about the current device flow situation. This gives several advantages over prior art solutions using reactive action, for instance faster detection of anomalies giving possibility to respond faster and thereby improve cellular capacity needs. As will be understood from the more detailed description of the approach below, analysis of the mobility situation enables detection of trends and prediction of capacity needs, which will further provide capability to respond faster to changes and anomalies in mobility situation. Also other advantages may be envisioned; improved user experience or resource allocation, e.g., transportation, logistics issues, stock building or pricing of goods. Another important advantage with some embodiments of the invention is that one can collect information within a specific area, e.g. for a set of NW nodes, which is not possible in case of an over-the-top solution approach being used since in such a solution there is no interaction between the controller node and the NW node on NW node level.

Figure 4:
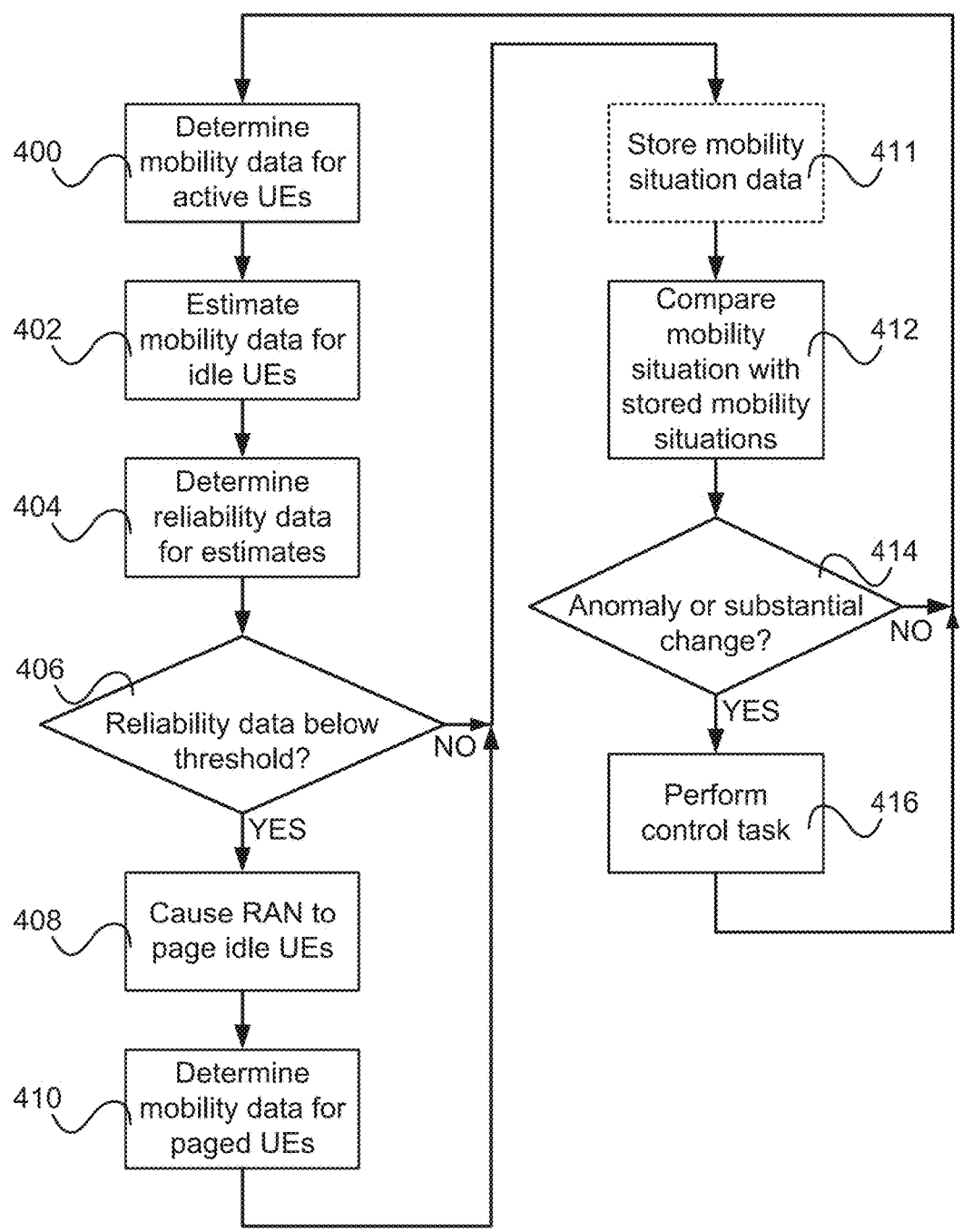
FIG. 4 is a flow chart illustrating a method according to an embodiment.

FIG. 4 is a flow chart illustrating a method according to an embodiment, which method is performed by a controller node arranged to act with or within the RAN. The controller node determines 400 mobility data for active UEs. Since those UEs are actively interacting with the respective serving network nodes of the RAN, their positions are known at least on a cell basis. In dense areas in view of cell size, i.e. small area cells, their positions are quite well-defined. UE positions may optionally be determined by considering signal time-of-arrival, channel attenuation between the UE and network node, data used for providing beamforming towards the UE from the network node, or by the UEs providing their positions which are determined in the UEs with aid of a satellite positioning system, e.g. a global navigation satellite system such as the Global Positioning System. Such additional positioning may take place by some UEs anyway for use in higher layer services. The controller node further estimates 402 mobility data for idle UEs. Since those UEs are not actively interacting with the RAN, their positions can only be estimated from e.g. their last determined position when they were active, made a tracking area update or performed any other interaction. The reliability of this data is determined 404, e.g. based on for example the age of the last determined position, mobility history, etc. For example, the mobility history of a particular UE may be that it has had the same position since it registered to the RAN, wherein an assumption may be made that it is a fixed device. In such case the reliability may be considered high although the age of the last determined position is high. In another example, the mobility history of a particular UE may be that it has had different positions at determinations, wherein an assumption may be made that it is likely a moving device. In such case the reliability may be considered low although the age of the last determined position is not that high. In another example, the reliability for all data may be based only on the age of the data for all UEs for sake of simple implementation. For at least a subset of the idle UEs, the mobility data is scrutinized by checking 406 if their reliability data is below a threshold. This may be done per UE, per a group of UEs, etc., i.e. the subset of UEs, the reliability figure, and threshold value are chosen accordingly. If reliability is above the threshold, the picture of the mobility situation is considered solid, and the mobility situation may be pushed on to analysis thereof. If reliability is below the threshold, the controller node causes 408 the RAN to page the idle UEs of the subset, wherein the RAN is able to acquire positions at least on a cell level for the subset of UEs and communicate this to the controller node, wherein the controller node determines 410 mobility data for the paged UEs. Thus, the picture of the mobility situation is considered solid, and the mobility situation may be pushed on to analysis thereof.

The above elucidated part of the method may be considered as a mobility situation monitoring part which provides a picture of the actual mobility situation. This mobility monitoring part involves the RAN to a high degree, and the actions of the controller node according to the method thus involve interacting with or within the RAN. When an actual mobility situation is acquired, the controller node performs an analysis thereof, and then based on the analysis of the mobility situation, and when an anomaly or change is detected, the controller node initiates a control action which again involves interaction with or within the RAN.

The determined mobility situation may optionally be stored 411, e.g. for populating a database from which statistics can be formed, trends be monitored, etc. The actual mobility situation is compared 412 with a stored mobility situation. The stored mobility situation may for example be based on statistics, i.e. the comparison 412 is made in view of a "normal" mobility situation, wherein it can be determined 414 whether the actual mobility situation is an anomaly. Alternatively, the stored mobility situation may be a previously determined mobility situation, wherein it can be determined 414 whether the mobility situation has changed. In both cases, i.e. whether there is an anomaly or a change, the determination 414 whether there is a difference between the actual mobility situation and the "normal" or previous mobility situation preferably includes some threshold for determining if the anomaly or change is substantial such that smaller deviations, inaccuracies, noise in measurement values and estimates, etc. are neglected. If no anomaly or change is detected 414, the procedure returns to monitoring the mobility situation. If there is a detected change or anomaly, the controller node may perform 416 a control task. This control task may include providing control instructions to or within the RAN, which in turn may reconfigure, e.g. switching on and/or off network nodes to increase capacity and/or save power where needed/possible. Also in this case, the monitoring of the mobility situation continues.

Figure 5:
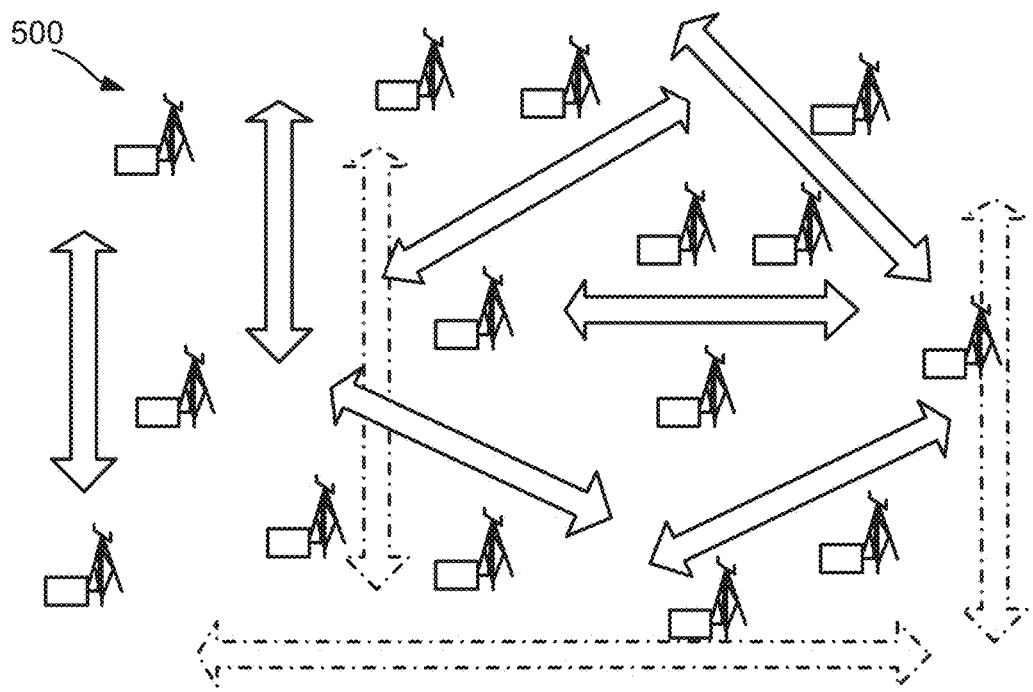
FIG. 5 schematically illustrates a part of a RAN with indications of mobility flows according to conventional statistics collection.

FIG. 5 schematically illustrates a part of a RAN with indications of mobility flows according to conventional statistics collection. The RAN is illustrated as a plurality of network nodes 500 and by arrows indicating mobility flows of UEs. Here, the solid line arrows are intended to indicate movements at walking speed while the dash-dot line arrows are intended to indicate movement at higher speed, e.g. vehicle speed. The different speed categories may be part of the mobility model. It works well to configure operation of the network nodes of the RAN according to such mobility model if the mobility behaviour is fairly static. However, as will be demonstrated herein, improvements in sense of power consumption and/or how the service is experienced may be made by also considering deviations from this static mobility behaviour. Returning to the introductory definition of the terms "mobile communication device" and "UE", and the context of mobility behaviour as discussed above, it should be noted that among all UEs present in the depicted part of the RAN, some have the ability to move, and thus causing the depicted flows, while others may be fixed, and thus do not cause any flow, but all UEs are part of the mobility behaviour, i.e. being spatially fixed is also a mobility behaviour; a very well-defined mobility behaviour.

Figure 6:
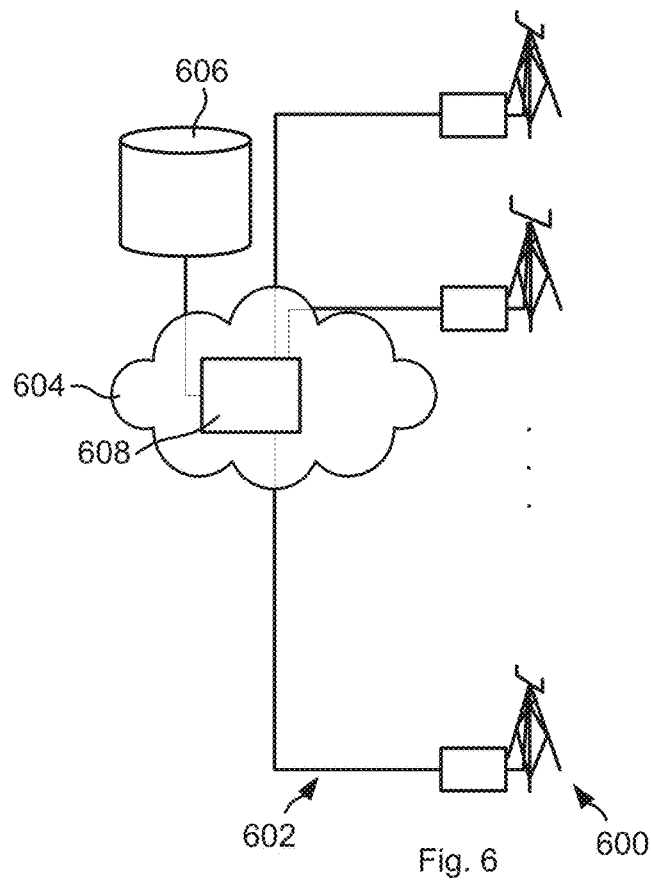
FIG. 6 schematically illustrates network nodes of a RAN and interaction with a controller node.

FIG. 6 schematically illustrates network nodes 600 of a RAN and interaction with a controller node 608. The controller node 608 interacts via some interfaces 602 to the network nodes 600, and may be implemented as a cloud solution 604, i.e. the controller node 608 may be arranged to act with the RAN, or be a part of the RAN, i.e. to be arranged to act within the RAN. In FIG. 6 there is illustrated a database element 606 connected to the controller node 608. This database element 606 may also be an integral part of the controller node 608. The database element 606 may comprise a database from which statistics can be formed, monitoring trends, etc. as discussed above. The interfaces 602 between the controller node 608 and the network nodes 600 are used both for the collecting of mobility data and for providing control instructions to the network nodes. The control instructions may comprise instructions related to the monitoring, e.g. instructions to page UEs or to provide position data. The control instructions may also comprise instructions related to changing set-up of the RAN in view of the analysis of the mobility situation, as discussed above.

It should be noted that the controller node 608 may be, as well as a physical node within the RAN or a physical node interacting with the RAN, considered as a service provided by one or more servers, which is popularly referred to as a cloud service, or simply as a Service, aaS. The service may also be provided by a mechanism distributed among network nodes of the RAN. The distribution may vary over time, e.g. one network node may act as controller node for a plurality of neighbouring network nodes at one time and at another time some other network node takes over the task of acting as the controller node. As will be demonstrated below, the controller node may be implemented as a processor executing a computer program for performing its tasks. In view of the discussion above, the processor may be a plurality of processors distributed in an arbitrary way. In any of these examples, the controller node will act as demonstrated above, e.g. as demonstrated with reference to FIG. 4.

Figure 7:
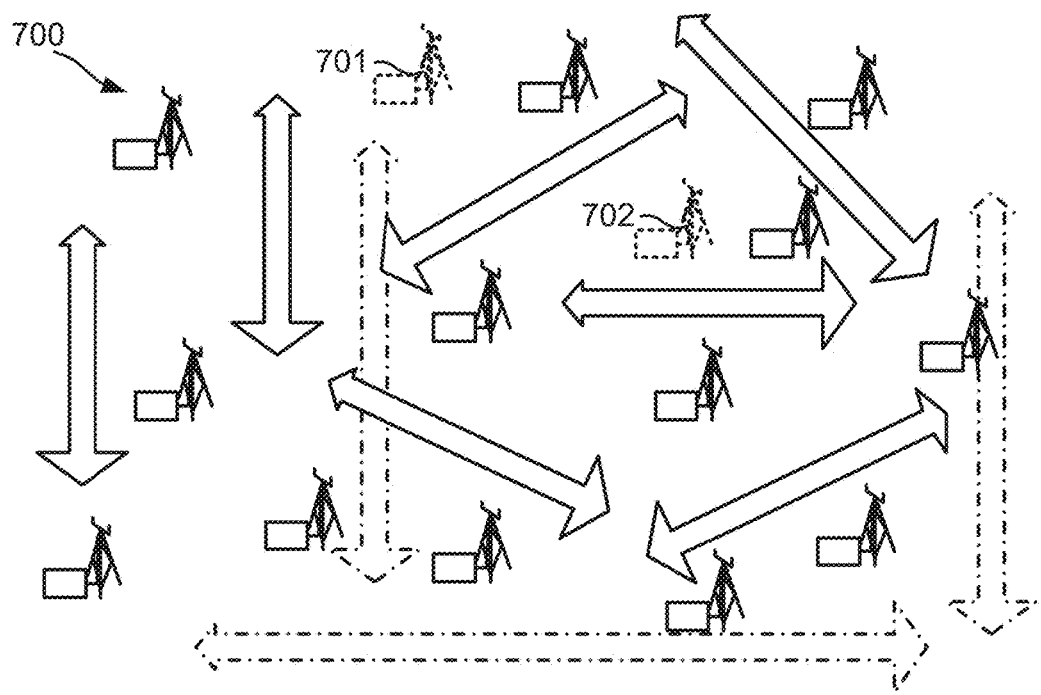
FIG. 7 schematically illustrates a part of a RAN with indications of mobility flows according to mobility situation determination according to an embodiment.

FIG. 7 schematically illustrates a part of a RAN with indications of mobility flows according to mobility situation determination according to an embodiment. The RAN is illustrated as a plurality of network nodes 700 and by arrows indicating actual mobility flows of UEs. The illustration is on purpose made similar to the one illustrated in FIG. 5, but the arrows are adapted in size with intention to indicate an actual deviation in the mobility situation to the statistics based mobility situation illustrated in FIG. 5. FIG. 7 also indicates a possible action taken based on the determined mobility situation, which deviates from the statistics as of FIG. 5, by illustrating that network nodes 701 and 702 may for example be switched off to save power since the mobility flows indicate that proper service may be acquired without having those network nodes 701, 702 active.

Figure 8:
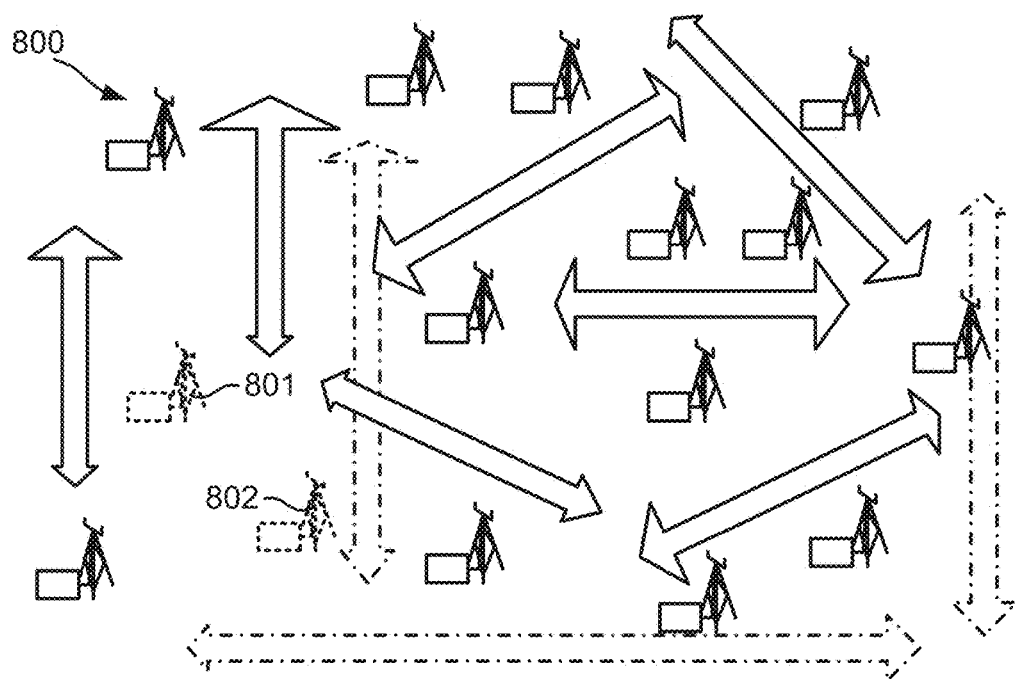
FIG. 8 schematically illustrates a part of a RAN with indications of mobility flows according to mobility situation determination according to an embodiment.

Similarly, FIG. 8 schematically illustrates a part of a RAN with indications of mobility flows according to mobility situation determination according to an embodiment. The RAN is illustrated as a plurality of network nodes 800 and by arrows indicating actual mobility flows of UEs. Here, some other network nodes 801, 802 may for example be switched off to save power since the mobility flows indicate that proper service may be acquired without having those network nodes 801, 802 active. If the situation illustrated in FIG. 7 would have been previous to the one illustrated in FIG. 8, the inactivated network nodes 701, 702 would be switched on again if the situation changed into the one illustrated in FIG. 8.

Figure 9:
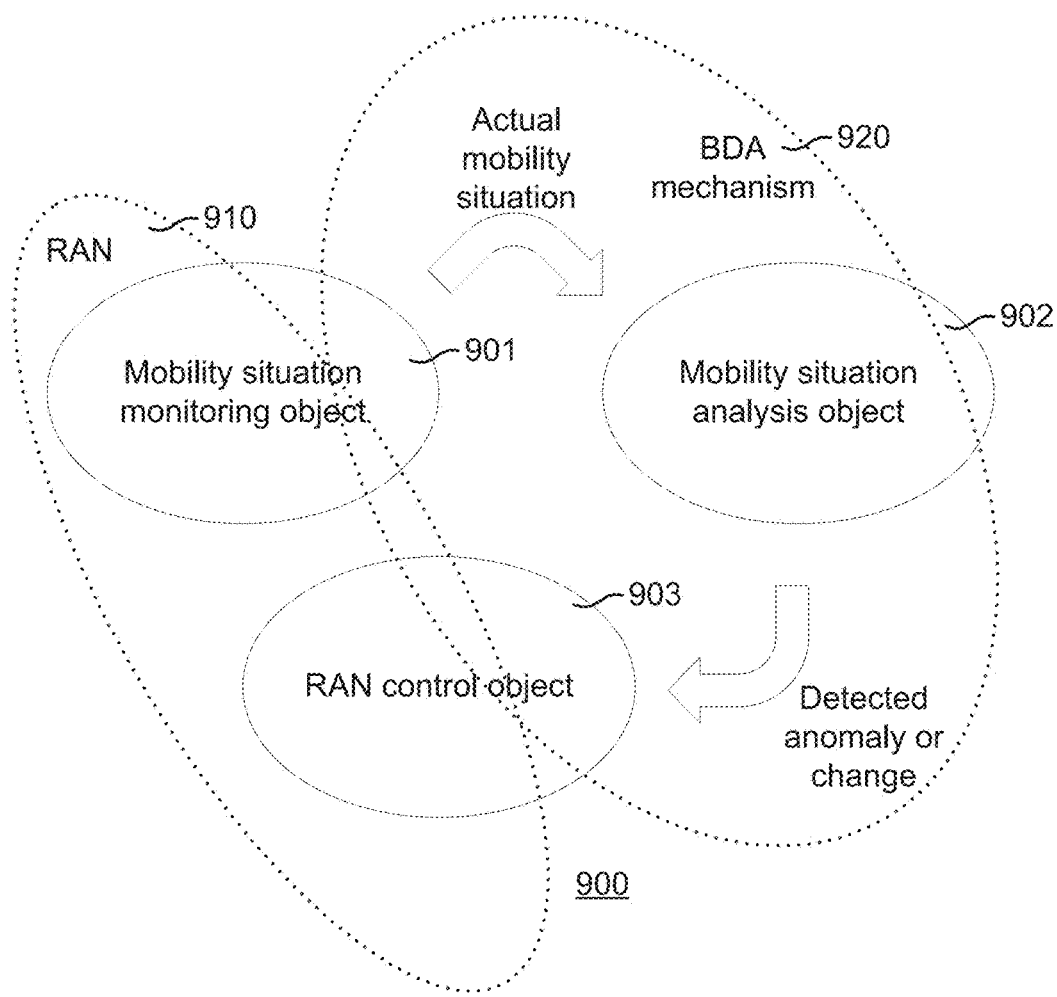
FIG. 9 schematically illustrates functional objects according to an embodiment.

FIG. 9 schematically illustrates functional objects according to an embodiment. Here, the actions are divided into a mobility situation monitoring object 901, which for example may include the actions 400-410 as illustrated in FIG. 4. The mobility situation monitoring object 901 collects mobility data for at least a part of the UEs operating in at least a part of the RAN. The mobility situation monitoring object 901 provides an actual mobility situation, e.g. continuously or periodically, to a mobility situation analysis object 902. The mobility situation analysis object 902 checks whether changes or anomalies in mobility situation occurs. Here, an anomaly is a deviation from a mobility situation according to statistics, which is used if the statistically given mobility situation is the one to use as default, and a change is a deviation from a previously determined mobility situation, which is used if the previously given mobility situation is the one to use as default. The mobility situation analysis object 902 provides any detected anomaly or change to a RAN control object 903, which may take one or more control actions for the RAN upon a detected change or anomaly in the mobility situation. The control action is preferably based on the knowledge about the actual mobility situation or any trend analysis thereof. In FIG. 9 there are two dotted areas 910, 920 to help the reader to understand the context of the objects 901-903. The area 910 represents interactions with the RAN and its network nodes and the area 920 represents the Big Data Analytics, BDA, mechanism which handles the collected information and provides analysis and suggested actions. The actual collection of data in sense of interacting with the UEs is performed by the RAN, as well as the actual control of network nodes. However, logically it is the BDA mechanism which collects the data and provides the control actions to be taken. It is to be noted that this functional representation is intended for easier understanding of the herein described approach, while its actual implementation is made by a controller node within the RAN or interacting with the RAN.

Figure 10:
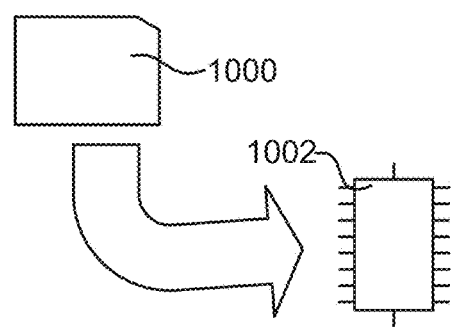
FIG. 10 schematically illustrates a computer-readable medium and a processing device.

The methods according to the present invention are suitable for implementation with aid of processing means, such as computers and/or processors. Therefore, there is provided computer programs, comprising instructions arranged to cause the processing means, processor, or computer to perform the steps of any of the methods according to any of the embodiments described with reference to FIGS. 4 and 9. The computer programs preferably comprises program code which is stored on a computer readable medium 1000, as illustrated in FIG. 10, which can be loaded and executed by a processing means, processor, or computer 1002 to cause it to perform the methods, respectively, according to embodiments of the present invention, preferably as any of the embodiments described with reference to FIGS. 4 and 9. The computer 1002 and computer program product 1000 can be arranged to execute the program code sequentially where actions of the any of the methods are performed stepwise, but may be executed on a real-time basis, where the illustration in FIG. 9 may be particularly suitable example for assigning of interacting real-time objects. The processing means, processor, or computer 1002 is preferably what normally is referred to as an embedded system. Thus, the depicted computer readable medium 1000 and computer 1002 in FIG. 10 should be construed to be for illustrative purposes only to provide understanding of the principle, and not to be construed as any direct illustration of the elements.

The invention claimed is:

1. A controller node arranged to act with or within a cellular radio access network, RAN, wherein the controller node is arranged to:
   determine mobility data for User Equipment, UEs, in active mode in at least a part of the RAN;
   estimate mobility data for UEs in idle mode in the at least the part of the RAN and determine reliability of the mobility data estimates;
   cause the RAN to page, when reliability of mobility data estimates of a set of the idle UEs is below a threshold, the set of the idle UEs and receive updated position information for the mobility data estimates;
   determine a mobility situation within the at least the part of the RAN from the determined mobility data for the active UEs and the estimated mobility data for the idle UEs;
   compare the determined mobility situation with one or more stored mobility situation data; and
   take one or more control actions for the RAN upon a change in the determined mobility situation and based on the comparison.

2. The controller node of claim 1, wherein the comparison includes to identify an anomaly or change in trend of mobility situation, wherein the one or more action includes to cause one or more network nodes of the RAN to change operation.

3. The controller node of claim 2, wherein the change of operation includes switching on or off operation.

4. The controller node of claim 1, wherein the one or more stored mobility situation data sets comprises a representation of a previous or historical mobility situation, or statistics on mobility situations.

5. The controller node of claim 1, wherein the set of idle UEs is defined by an area being paged.

6. The controller node of claim 1, wherein the set of idle UEs is defined by a certain selection of UEs.

7. The controller node of claim 1, wherein the received updated position information comprises one or more of:
   a cell identification;
   a satellite position system provided position; and
   a position determined based on transmission properties between the respective UE and network nodes of the RAN.

8. The controller node of claim 1, wherein the mobility situation is determined at regular occasions.

9. The controller node of claim 1, wherein the one or more actions includes to exchange information with one or more external entities, wherein the exchange of information includes providing data on the mobility situation.

10. The controller node of claim 9, wherein the exchange of information includes to provide control information for performing one or more of:
    reserving storage or computing resources;
    migrating databases or applications from a first server to a second server;

adapting operation of a charging mechanism associated with the cellular RAN; and reserving or allocating backhaul communication capacity.

11. A method of a controller node arranged to act with or within a cellular radio access network, RAN, the method comprising:
- determining mobility data for UEs in active mode in at least a part of the RAN;
- estimating mobility data for UEs in idle mode in the at least the part of the RAN and determining reliability of the mobility data estimates;
- causing the RAN to page, when reliability of mobility data estimates of a set of the idle UEs is below a threshold, the set of the idle UEs and receive updated position information for the mobility data estimates;
- determining a mobility situation within the at least the part of the RAN from the determined mobility data for the active UEs and the estimated mobility data for the idle UEs;
- comparing the determined mobility situation with one or more stored mobility situation data; and
- taking one or more control actions for the RAN when a change or anomaly is discovered in the determined mobility situation and based on the comparison.

12. The method of claim 11, wherein the comparing includes identifying the anomaly or change in a trend of the mobility situation, wherein the one or more control actions include causing one or more network nodes of the RAN to change operation.

13. The method of claim 12, wherein the change of operation includes switching on or off operation.

14. The method of claim 11, wherein the one or more stored mobility situation data sets comprises a representation of a previous or historical mobility situation, or statistics on mobility situations.

15. The method of claim 11, wherein the set of idle UEs is defined by an area being paged.

16. The method of claim 11, wherein the set of idle UEs is defined by a certain selection of UEs.

17. The method of claim 11, wherein the received updated position information comprises one or more of
- a cell identification;
- a satellite position system provided position; and
- a position determined based on transmission properties between the respective UE and network nodes of the RAN.

18. The method of claim 11, wherein the mobility situation is determined at regular occasions.

19. The method of claim 11, wherein the one or more actions includes exchanging information with one or more external entities, wherein the exchanging of information includes providing data on the mobility situation.

20. The method of claim 19, wherein the exchanging of information includes providing control information for performing one or more of:
- reserving storage or computing resources;
- migrating databases or applications from a first server to a second server;
- adapting operation of a charging mechanism associated with the cellular RAN; and
- reserving or allocating backhaul communication capacity.

21. A nontransitory computer readable storage medium comprising instructions which, when executed on a processor of a controller node arranged to act with or within a cellular radio access network, RAN, causes the controller node to perform a method comprising:
- determining mobility data for UEs in active mode in at least a part of the RAN;
- estimating mobility data for UEs in idle mode in the at least the part of the RAN and determining reliability of the mobility data estimates;
- causing the RAN to page, when reliability of mobility data estimates of a set of the idle UEs is below a threshold, the set of the idle UEs and receive updated position information for the mobility data estimates;
- determining a mobility situation within the at least the part of the RAN from the determined mobility data for the active UEs and the estimated mobility data for the idle UEs;
- comparing the determined mobility situation with one or more stored mobility situation data; and
- taking one or more control actions for the RAN when a change or anomaly is discovered in the determined mobility situation and based on the comparison.

* * * * *